United States Patent [19]

Willard

[11] Patent Number: 4,592,001

[45] Date of Patent: May 27, 1986

[54] SPEED GAUGING INDICATOR

[75] Inventor: Virginia D. Willard, Galveston, Tex.

[73] Assignee: Lindsay E. Austin, Texas City, Tex. ; a part interest

[21] Appl. No.: 516,784

[22] Filed: Jul. 22, 1983

[51] Int. Cl.[4] .............................................. G01P 3/66
[52] U.S. Cl. .................................... 364/565; 324/178
[58] Field of Search .............. 364/565, 561, 569, 438, 364/709, 715; 377/20, 23, 24; 324/160, 166, 172

[56] References Cited

U.S. PATENT DOCUMENTS 3,530,382  9/1970  Liston et al. .................... 364/565 X
4,219,878  8/1980  Goodson et al. .................. 364/565
4,352,064  9/1982  Dunn ............................. 364/565 X
4,383,302  5/1983  Harris et al. ....................... 364/565

Primary Examiner—Gary Chin
Attorney, Agent, or Firm—Harvey B. Jacobson

[57] ABSTRACT

The time elapsed between passing landmark posts observed from a moving vehicle, is measured by manually controlled start and stop of a timing cycle, and such time measurement is utilized to perform a velocity calculation based on selection of a memory stored data relating to distances between uniformly spaced types of landmark posts. The time measurements as well as the velocity calculations are exhibited on a digital display.

10 Claims, 3 Drawing Figures

SPEED GAUGING INDICATOR

BACKGROUND OF THE INVENTION

This invention relates to self-contained devices for measuring and calculating the speed of moving vehicles such as railroad trains.

It has been the general practice of engineers, conductors, brakemen and other crew members on railroad trains to utilize a conventional watch or chronometer and a timetable chart to gauge train speed by observing passing landmarks such as mile posts. Such an outmoded speed gauging method is not only subject to errors but diverts attention from other vital duties.

It is therefore an important object of the present invention to provide crewmen on railroad trains or the like with a more simple and accurate means for gauging speed without reliance on any complex and costly speed measuring system.

Another object is to provide a device for gauging and indicating speed of a moving vehicle or train in a rapid and accurate manner by observance of passing landmarks of different types.

SUMMARY OF THE INVENTION

In accordance with the present invention, a portable, hand held indicator device is provided having a digital display on which elapsed time information is exhibited based on the measured duration of timing cycles initiated and terminated by successive manual actuation of a start/stop switch. The display is also operative in a speed indicating mode to exhibit information obtained by calculation of velocity based on the same aforementioned measurement of elapsed time and selected distance data stored in a memory. Data selection is effected by manual actuation of a distance selector switch enabled during each timing cycle being measured. Timing cycles are initiated and terminated by an observer observing passing landmarks, such as posts, from a vehicle moving along a predetermined path, the posts being spaced apart by uniform distances dependent on the type of posts being observed. The distance selector switch will therefore have plural operative positions respectively corresponding to landmark posts spaced apart by different distances, such as mile posts and telephone posts spaced apart by 300 feet.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

DETAILED DESCRIPTION OF PREFERRED EMBODIMENT

Figure 1:
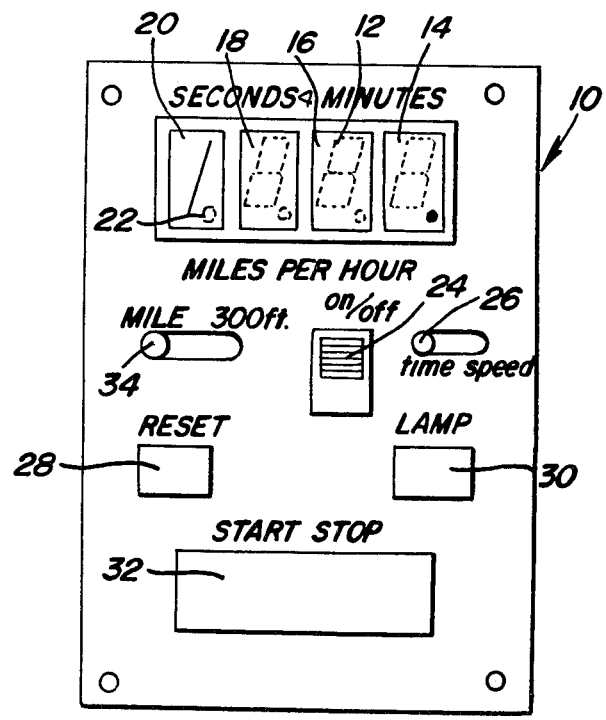
FIG. 1 is a front elevation view of an indicator device in accordance with one embodiment of the invention.

Referring now to the drawings in detail, FIG. 1 illustrates the front panel of an indicating device constructed in accordance with the present invention, generally referred to by reference numeral 10. A digital display assembly 12 is associated with the device 10, which includes four liquid crystal display (LCD) portions 14, 16, 18 and 20. The LCD portions 14, 16 and 18 are of the seven segment type respectively exhibiting digits representing units, tens and hundreds. The LCD portion 20 exhibits digits representing thousands. Decimal points at 22 are also selectively exhibited by each of the LCD portions 16, 18 and 20 of the display assembly.

Also mounted on the front panel of the indicating device 10 is a power switch 24 through which the device is placed in an energized condition for operation. The operational readout mode of the display assembly is set by a two position toggle switch 26 for readout on the display assembly 12 of either time in seconds and then minutes, or speed in terms of miles per hour. The display assembly may be reset by actuation of a push button reset switch 28 and illuminated for reading under poor lighting conditions by actuation of a push button lamp switch 30.

A timing operation of the device 10 is initiated by actuation of a manual entry type of start/stop push button switch 32. Such actuation of switch 32 starts a timing cycle which is terminated by subsequent actuation of the same switch 32. In the speed indicating mode of the device set through switch 26, a velocity calculation is performed based on a selected one of at least two distances determined by the setting of a two position toggle switch 34.

Figure 2:
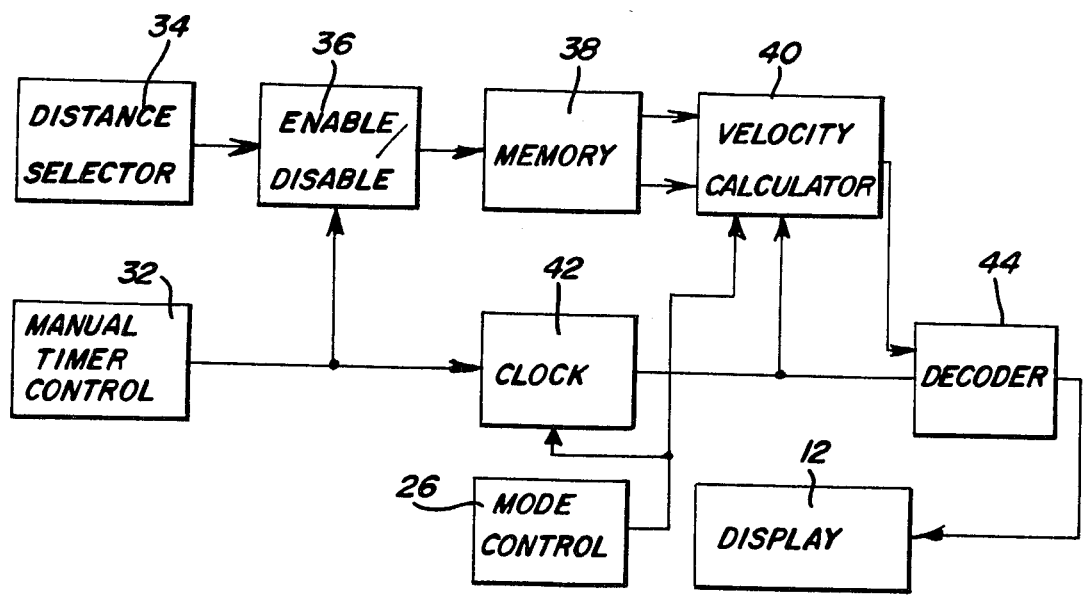
FIG. 2 is a block diagram schematically illustrating the indicator device from a functional standpoint.

As diagrammed in FIG. 2, the setting of distance selector switch 34 is operative through a functional enable/disable component 36 to control readout from a memory component 38 of data relating to distances of one mile or 300 feet. Such data is fed to a velocity calculating component 40 from which an output is obtained based on time elapsed between successive actuations of the start/stop control 32, as measured by clock component 42. The outputs of the velocity calculator 40 and clock 42 are fed to a decoder component 44 through which the output is exhibited by the display assembly 12. The type of output information displayed is determined by the setting of the mode control switch 26 as aforementioned in connection with FIG. 1.

Figure 3:
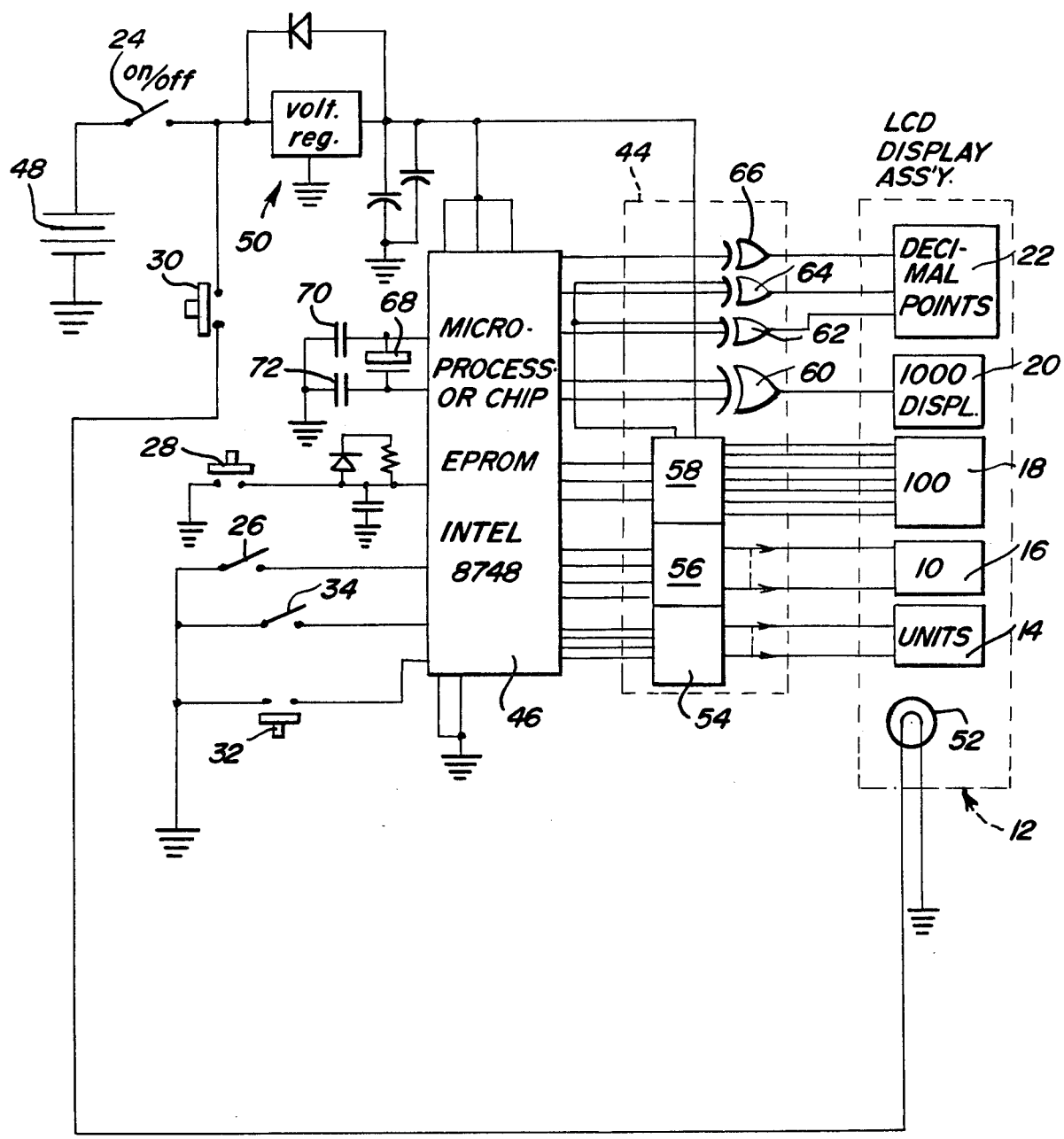
FIG. 3 is a circuit diagram corresponding to the indicator device shown in FIG. 1.

The functional components 36, 38, 40 and 42 described in connection with FIG. 2, may be embodied in a microprocessor EPROM chip 46 as shown in FIG. 3, identified as INTEL 8748. The switches 26, 28, 32 and 34 are connected between ground and appropriate control terminals of the chip 46. Power switch 24 connects a grounded battery source of energy 48 to a voltage regulating circuit 50 from which all components of the device are energized. A display lamp 52 in the display assembly 12 is, however, energized directly from the battery source by closing of lamp switch 30 connected thereto in series with power switch 24.

The data output terminals of the chip 46 are connected to the decoder component 44 which includes three decoder chips 54, 56 and 58 respectively connected to the LCD portions 14, 16 and 18 of the display assembly 12. A gate 60 connects two output terminals of the chip 46 to LCD portion 20 while gates 62, 64 and 66 respectively connect single data output terminals to the decimal points 22 in the LCD portions 20, 18 and 16. The operational frequency of the clock component is controlled by a crystal 68 connected across two control terminals of the chip 46 which are respectively connected to grounded capacitors 70 and 72.

The indicating device 10 as hereinbefore described will be useful in measuring the elapsed time between uniformly spaced landmarks observed from a moving vehicle, such as posts installed along the tracks forming the path of a railroad locomotive or train from which such posts are readily observed. With the mode control switch 26 in its time position, the display 12 will indicate the elapsed time measured by the timer component in terms of seconds and minutes as aforementioned. Such measurement is effected by actuation of the start/stop switch 32 to initiate a timing cycle as one landmark post is passed, followed by actuation of switch 32 again when the next post is passed to terminate the timing cycle.

When the mode control switch 26 is in the speed position, the device will again be effective to perform the aforementioned timing operation as well as to calculate and display the speed of the vehicle from the same elapsed time measurement effected by manual actuation of the start/stop switch 32 as hereinbefore described. The velocity calculations will, however, depend on the setting of the distance selector switch 34 which is enabled each time a timing cycle is initiated by actuation of switch 32. Thus, after a timing cycle is initiated by the user observing a passing landmark post, the setting of distance selector switch 34 may be changed, in accordance with the type of post observed, at any time before termination of the timing cycle. If mile posts are being observed, the distance selector 34 is set at the mile position, whereas it is set at the 300 feet position when railroad telephone posts are being observed. As an alternative to use of telephone posts, the passing of six stationary railroad cars of the standard 50 feet lengths, could be utilized as the landmarks along the travel path. The distance selector 34 is disabled when the timing cycle is terminated.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. For use in determining the speed of an observer from a vehicle moving along a path, along which landmarks of different types are respectively spaced from each other by predetermined uniform distances, a time and velocity indicating device comprising timer means for measuring time of movement of the said vehicle between said landmarks, means connected to the said timer means for calculating velocity of the said vehicle from the measured time and said distances, and visual display means connected to the said timer means and the said velocity calculating means for alternative readout of the measured time and the calculated velocity, the improvement including memory means connected to the velocity calculating means for storing data related to a plurality of said predetermined uniform distances, and distance selector means connected to the memory means for selecting said stored data to control operation of the velocity calculating means in accordance with the type of landmarks observed by the observer.

2. The improvement as defined in claim 1 wherein said timer means includes manual entry means for initiating and terminating timing cycles of measured duration corresponding to successive observance of two of the landmarks from the moving vehicle, and means responsive to said initiation and termination of the timing cycles for respectively enabling and disabling the said distance selector means.

3. The improvement as defined in claim 2 wherein said distance selector means comprises a manually actuated switch having at least two operative positions respectively corresponding to the predetermined uniform distances of one mile and 300 feet.

4. The improvement as defined in claim 3 wherein the moving vehicle is a railroad car.

5. The improvement as defined in claim 1 wherein said distance selector means comprises a manually actuated switch having at least two operative positions respectively corresponding to the predetermined uniform distances of one mile and 300 feet.

6. In a speed indicating device having timer means for measuring time elapsed between observance of landmarks from a vehicle moving along a predetermined path, means for calculating velocity of the said vehicle and visual display means for readout of vehicle speed from the said velocity calculating means, the improvement including memory means for storing data related to a plurality of uniform distances between said landmarks, distance selector means connected to the said memory means for selecting said stored data to control operation of the said velocity calculating means in accordance with the landmarks observed, manual entry means connected to the said timer means for initiating and terminating timing cycles of measured duration corresponding to said elapsed time between the observed landmarks, and means responsive to said initiation and termination of the said timing cycles for respectively enabling and disabling the distance selector means.

7. The improvement as defined in claim 6 wherein said landmarks are established by posts of different types.

8. The improvement as defined in claim 7 wherein said posts of one type are mile posts and the posts of another type are railroad telephone posts uniformly spaced from each other by 300 feet.

9. The improvement as defined in claim 8 wherein said distance selector means comprises a manually actuated switch having at least two operative positions respectively corresponding to the uniform distances of one mile and 300 feet.

10. The improvement as defined in claim 6 wherein said distance selector means comprises a manually actuated switch having at least two operative positions respectively corresponding to the uniform distances of different magnitudes.

* * * * *